United States Patent [19]

Sobeck

[11] 4,092,050
[45] May 30, 1978

[54] RACK ASSEMBLY FOR A LAND VEHICLE

[76] Inventor: Gerald A. Sobeck, P.O. Box 97, Kellogg, Minn. 55945

[21] Appl. No.: 729,823

[22] Filed: Oct. 5, 1976

[51] Int. Cl.² .............................................. B60P 1/16
[52] U.S. Cl. .................................. 298/18; 280/106 T; 296/3
[58] Field of Search ................ 280/106 T, 180; 296/3, 296/4, 6, 7, 8, 9, 11, 12, 14; 298/18, 19 R; 214/501, 506

[56] References Cited

U.S. PATENT DOCUMENTS

| | | | |
|---|---|---|---|
| 2,661,235 | 12/1953 | Isachsen | 298/18 |
| 2,728,602 | 12/1955 | Casey et al. | 298/18 |
| 3,922,036 | 11/1975 | Kalsbeck et al. | 298/18 |

FOREIGN PATENT DOCUMENTS 262,633  9/1964  Australia .................................. 296/3

*Primary Examiner*—Joseph F. Peters, Jr.
*Assistant Examiner*—Donn McGiehan
*Attorney, Agent, or Firm*—Hill, Gross, Simpson, Van Santen, Steadman, Chiara & Simpson

[57] ABSTRACT

A rack for a land vehicle such as for hauling large round bales of hay, straw, etc. includes a base attachable to the land vehicle, a pair of load-carrying racks pivotally carried thereon, the racks when loaded being pivotable or tiltable in response to gravity, and a trip-lock mechanism for selectably releasing the racks to enable them to tilt and to thereby unload themselves.

17 Claims, 9 Drawing Figures

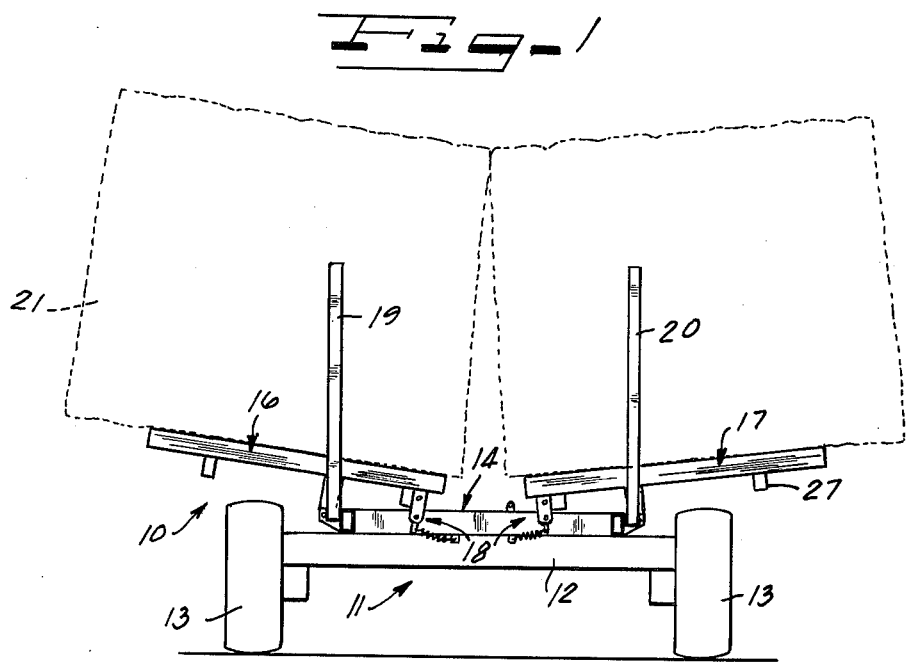
Fig-1
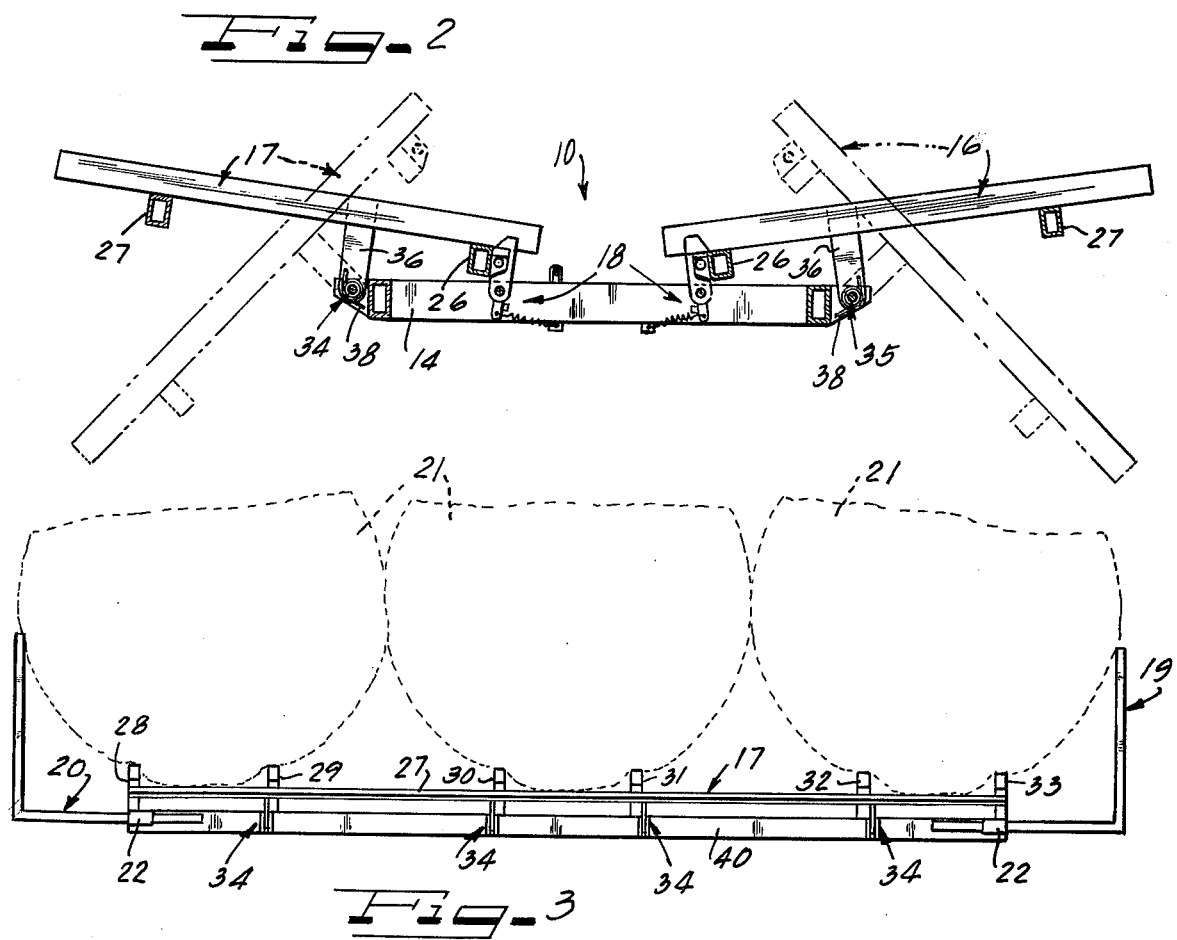
Fig-2
Fig-3

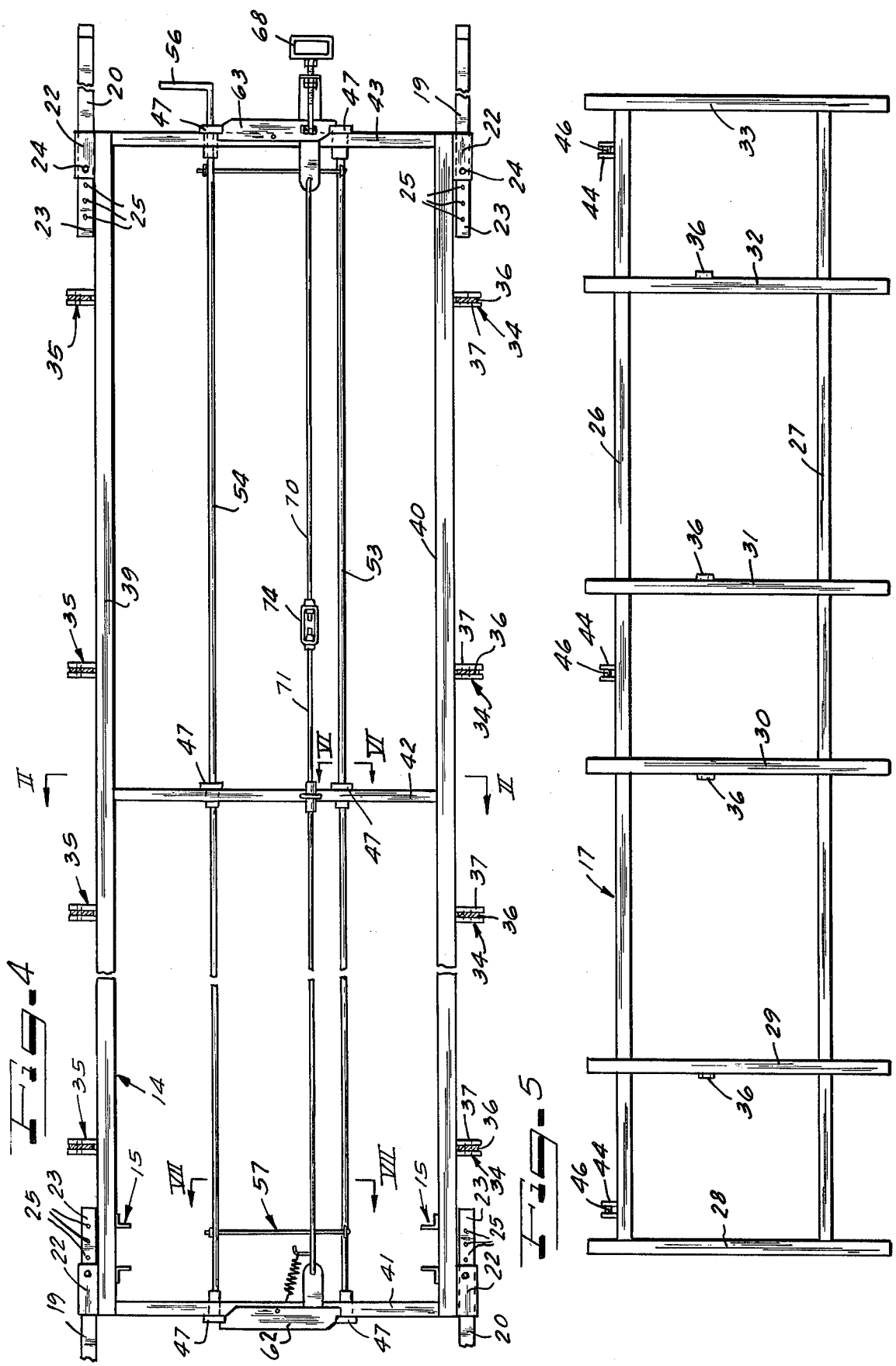

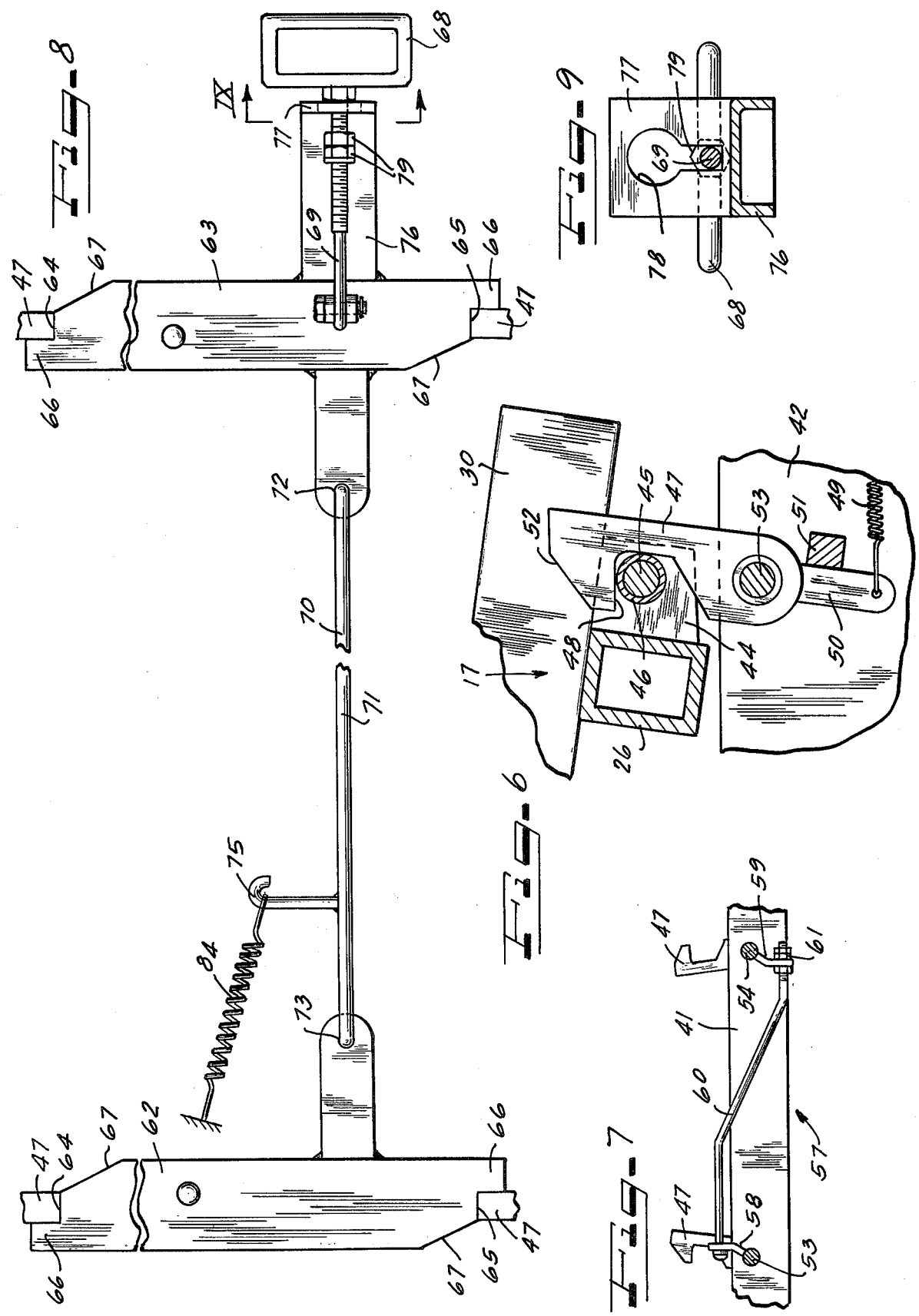

RACK ASSEMBLY FOR A LAND VEHICLE

BACKGROUND OF THE INVENTION

1. Field of the Invention

This invention pertains to a rack assembly for a land vehicle, the same being of the self-unloading type.

2. Prior Art

The field of crop harvesting equipment has included the development of various types of baling machines for hay, straw, and the like and the latest balers produce relatively large and heavy bales of hay or the like which are cylindrical, having a typical diameter of about six feet and a similar length. The baling machine drops these bales in the field where they grew. These bales have a weight which typically is between 1,100 and 1,600 pounds, depending upon the crop that has been baled. Obviously, these bales are too heavy for manual handling.

Heretofore, when it has been desired to move the bales from the field of origin to a remote destination it has been necessary to have some type of mechanized loading equipment available for loading such bales onto an appropriate land vehicle. Such equipment may comprise a tractor having a front end loader. The loaded vehicle has then been moved to an appropriate destination, such as a feed lot for cattle, and the loading equipment has been also transported to such site to effect unloading. Where bales are to be provided to live stock at two different locations, corresponding movement of the loader has been necessary to effect unloading. If numerous bales are to be transported, either a plurality of tractors with loading/unloading equipment are necessary, or else such tractor has had to be moved between the various sites.

SUMMARY OF THE INVENTION

The present invention is directed to a self-unloading rack that is particularly adapted for handling round bales of material, constructed to fit on a conventional farm wagon. The embodiment disclosed herein is constructed to handle six bales in a lower layer and four additional bales thereupon.

Accordingly, the invention includes a base on which there are pivoted a pair of load-carrying racks, a trip-lock mechanism acting between the base and the racks to hold the racks in a load-supporting position. When the trip-lock mechanism is actuated, owing at least in part to the weight of the bales, the racks pivot to enable the load to slide off.

Accordingly, it is an object of the present invention to provide a rack assembly for a land vehicle of the self-unloading type adapted to carry material that has been baled.

Another object of the present invention is to provide a self-unloading rack assembly which can be selectably unloaded in response to gravity.

A further object of the present invention is to provide a rack assembly for a land vehicle including racks that can be selectably released to enable them to tilt, including means for inhibiting or preventing such release.

A still further object of the present invention is to provide a rack assembly adapted to be unloaded by sliding movement of the load, and including means, preferably at both the front and rear ends of the rack assembly, for preventing the load from moving off either end of the rack assembly.

Many other advantages, features and additional objects of the present invention will become manifest to those versed in the art upon making reference to the detailed description and the accompanying sheets of drawings in which a preferred structural embodiment incorporating the principles of the present invention is shown by way of illustrative example.

ON THE DRAWINGS

FIG. 1 is a rear elevational view of a wagon provided with a rack assembly according to the present invention, a load being illustrated schematically thereon;

FIG. 2 is an enlarged cross-sectional view of the rack assembly of FIG. 1 taken substantially along the line II—II of FIG. 4, and showing the assembly in the load-supporting position, and in a chain line in a load unloading position;

FIG. 3 is a side elevational view of the loaded rack assembly;

FIG. 4 is a top view of the rack assembly with the racks omitted;

FIG. 5 is a top view of one of the racks in reduced scale;

FIG. 6 is an enlarged cross-sectional view of a fragmentary portion of the rack assembly taken along line VI—VI of FIG. 4;

FIG. 7 is a fragmentary elevational view taken along line VII—VII of FIG. 4;

FIG. 8 is an enlarged fragmentary view of a portion of FIG. 4; and

FIG. 9 is a further enlarged view taken along line IX—IX of FIG. 8.

AS SHOWN ON THE DRAWINGS

The principles of the present invention are particularly useful when embodied in a rack assembly for a land vehicle as shown in FIG. 1, generally indicated by the number 10. The rack assembly 10 is carried on a land vehicle 11, shown diagramatically to include a chassis 12 and a set of wheels 13,13.

The rack assembly 10 includes a base 14 having means such as flanges 15 (FIG. 4) by which the base is adapted to be secured to the chassis 12. A pair of load carrying racks 16,17 are pivotally secured to the base 14, there being a trip-lock mechanism 18 which releaseably holds the racks 16,17 in a load-supporting position illustrated in FIG. 1. Further, the base 14 may be provided with a pair of load-holders 19,20 at the front end and at the rear end as shown in FIGS. 1 and 3 to prevent any load such as a round bale 21 from rolling off the front end or the back end of the rack assembly 10. To that end, a socket 22 is secured to each of the four corners of the base 14, best shown in FIG. 4, each socket 22 having a horizontal opening of noncircular cross-section. Each load-holder 19,20 has a horizontal arm and a vertical arm which extends substantially at a right angle with respect to each other, as best shown in FIG. 3. The horizontal arm, identified at 23, has an external non-circular cross-section or external configuration enabling each of the arms 23 to be received in one of the sockets 22 and to be held thereby against any rotation about the axis of the opening in the socket 22. The other or normally vertical arm may have any cross-section. The load-holders 19,20 can be set at a selected position so as to compensate for the various sizes of bales 21. For this purpose, a pin 24 extends through the socket and through one of a number of normally vertical bores or through-holes 25 in each of the horizontal arms 23.

When it is not desired to use the load-holders 19,20, they may be withdrawn end-wise from the various sockets 22, and then turned 90° about the axis of the arms 23 and then reinserted in the sockets 22. The load-holders 19, as viewed from the respective ends, are turned in a clockwise direction for substantially 90° for this purpose, while the load-holders 20, similarly viewed, are turned counterclockwise. The cross-sectional configuration of the recess of the socket 22 and the outside of the arm 23 enable reception with the load-holders so repositioned. Under this condition, the arms 23 may be inserted all the way so that the other arms can be disposed adjacent to the ends of the base 14. A further through-hole is provided in each of the arms 23 by which the pins 24 may lock the load-holders 19,20 in such storage position. The effect of the load-holders 19,20 in use is that as the land-vehicle 11 goes up a hill, the load will not fall off to the rear, and as the vehicle goes down a hill, the load will not move forwardly, for example against the driver of a tractor (not shown) towing the vehicle 11.

The load carrying racks 16,17 are identical, except that one is a mirror image of the other, and therefore only one such rack 17 is shown in FIG. 5, disconnected from the base 14 of FIG. 4, and shown in reduced scale. Each rack 16,17 is elongated in the direction of vehicle travel, namely along the length of the rectangular base 14. Each rack such as 17 includes a pair of elongated tubular beams 26,27 of rectangular cross-section to which there is welded three pairs of load-supporting rails 28-33, which extend perpendicularly to the beams 26,27 and to the pivotal axis of the rack 17. Means providing a pivotal connection between each rack 16,17 and the base 14 are provided at four places on each rack, such pivotal connection being indicated in FIG. 2 by the numerals 34,35. To that end, each pivotal connection such as 34 includes a flange 36 shown in elevation in FIG. 2 welded to each of the rails 29-32 (FIG. 5) which, as shown in FIG. 4, extend between portions of a bifurcated bracket 37 welded to the base 14, there being a pivot pin in each pivotal connection 34 disposed in a common pivotal axis for each of the racks 16,17.

If desired, as shown schematically only in FIG. 2, such pivot pin may be longitudinally extended to receive thereabout a torsion spring 38 having one end acting against the frame 14 and another end acting against one of the flanges 36. When the rack 17 is in the position shown in solid lines in FIG. 2, the torsion spring 38 is pre-loaded. When the rack is in the tilted position shown in the chain line, the torsion spring 38 is further loaded, whereby the springs 38 either aid in the return of the rack to the load-supporting position, or even do so entirely in the absence of the load. The return spring means 38 can be constructed otherwise so as to provide a rack-returning force which is initially overcome by the weight of the bales as unloading begins.

The location of the pivotal connection 34 with respect to the center of gravity of each of the racks 17,16 is such that a substantial portion of the rack 17 projects beyond the base 14 and hence beyond the side edge of the vehicle in both the load-supporting position and in the unloading position. Thus a majority of the mass of the rack is at the side of the pivotal axis which is remote from the trip-lock mechanism 18. Once the trip-lock mechanism 18 is actuated, the loaded rack 17,16 tilts in response to gravity. Preferably, with the configuration disclosed, both of the racks should be enabled to tilt at the same time so that the load does not tilt the vehicle 11.

When the racks 16,17 are in the load-supporting position, the upper surfaces of the racks 16,17 which comprise the load-support surfaces, slope downwardly toward the center of the base 14 as best shown in FIG. 1. This feature laterally stabilizes the load by enabling bales on opposite racks to slide toward each other in response to movement over rough terrain, rather than to slide off the rack.

The base 14 comprises a rectangular weldment including two longitudinal beams 39,40 joined together by three transverse beams 41-43, the transverse beam 41 being at the rear of the base 14, the transverse beam 42 being substantially at the longitudinal center of the base 14, and the transverse beam 43 being at the front end of the base and of the land vehicle 11.

The trip-lock mechanism 18 is best shown in FIGS. 4 and 6-9, and most components thereof are carried on the transverse beams 41-43. The exception is that the rack 17 has on the central face of the inner longitudinal beam 26, a number (here three) of bifurcated brackets 44 each of which supports a pin 45 on which a roller 46 is pivotally mounted. Each of the rollers 46 is disposed just adjacent to and above one of the transverse beams 41-43 for cooperation with a corresponding number of latch dogs 47 best shown in FIG. 6. Each latch dog 47 has a hook portion 48 which engages the upper surface of one of the rollers 46 on the rack 16 or 17 and releasably holds such rack in the load-supporting position. Spring means 49 are provided to bias the latch dogs 47 against the rollers 46, the spring means 49 acting between a point on one of the transverse beams 41-43 and an extension or arm 50 on the latch dog 47. When the racks 16,17 are in a tilted or tripped position, the latch dogs 47 can return to the position shown in FIG. 6 and are limited against further movement by a stop 51 acting against the arm or extension 50, thereby disposing a cam surface 52 in the path of the returning roller 46 to enable relatching.

Means are provided as part of the trip-lock mechanism 18 for synchronizing the movement of the various latch dogs 47 so as to effect simultaneous release of the racks by such latch dogs 47. To that end, there is included a pair of rods 53,54 which are rotatably or rockably supported in the transverse beams 41-43 and to which each of the latch dogs 47 is corotatably secured. Thus, as seen in FIG. 6, if the rod 53 is pivoted in a clockwise direction, all three of the latch dogs 47 carried thereon will simultaneously release the rack 17. Similarly, though not shown, counterclockwise movement of the rod 54 will simultaneously release all of the latch dogs from the rack 16. As shown in FIG. 4, the rods 53,54 lie centrally of the space between the pivotal axis of the connection 34 and the pivotal axis of the connection 35.

In order to control the pivotal movements of the rods 53,54, which are spring-biased to the position shown such as in FIG. 6 by the spring means 49, one of the rods 53,54 is provided a manual actuator 56, here illustrated as attached to the rod 54. When the outer end of the manual actuator 56 is moved upwardly, the rod 54 pivots in a counter-clockwise direction for moving its latch dogs 47 in a releasing direction. Further, means generally indicated at 57 in FIG. 4 and shown in detail in FIG. 7 are provided which adjustably interconnect the rods 53,54 for simultaneous angular movement in opposite directions. To that end, an arm 58 is corotatably secured to the rod 53 and an arm 59 is corotatably secured to the rod 54, and a connecting rod 60 interconnects such arms, one extending above the pivotal axis and the other extending below the pivotal axis. Adjustment nuts 61 are provided on the threaded end of the connecting rod 60. When the rod 54 is moved by the actuator 56 in a counterclockwise direction, the arm 59 acting through the nuts 61 will tension the connecting rod 60 and, through an enlargement at the arm 58, act to rotate the rod 53 in a clockwise direction. The adjustment nuts 61 thus precisely coordinate the release times of the racks 16,17. The particular configuration of the actuator 56 is not critical but it is desirable that it be located centrally of the rack assembly 10 and spaced lengthwise therefrom so as to avoid interference.

The land vehicle 10 and the base 14 are inherently capable of being twisted, particularly in consequence of rolling on an uneven terrain, a circumstance that conceivably could cause rack-releasing movement of one or more of the latch dogs 47. For that reason, means are provided to prevent such movement. Such means includes a pair of locking bars 62,63 respectively supported for pivotal movement about a vertical axis on the transverse beams 41,43 of the base 14 as shown in FIG. 4. Each of the locking bars 62,63 has a pair of blocking surfaces 64,65 which are spaced apart by such a distance that when the locking bars 62,63 are pivoted to the position shown in FIG. 8, the portion of the locking bars 62,63 that extends between the blocking surfaces 64,65 substantially fills the space between opposite pairs of the latch dogs 47 so that the same cannot pivot, even if a pivoting force were applied thereto. At each end of each of the locking bars there is provided a limiting ear 66, at least one of which prevents the locking bar from moving through such space between the opposed latch dogs 47. At each end of each of the locking bars 62,63 there is a sloping surface 67 which provides clearance and can provide a camming effect for enabling latch dogs 47, to pivot in a releasing direction. It is desirable that the locking bars 62,63 be manually pivotable, simultaneously, and that they normally take the position illustrated in FIG. 8. To this end, there is provided a manual actuator 68 or handle connected by a rod 69 to the locking bar 63. The locking bar 62 is connected to the locking bar 62 by a pair of connected rods 70,71 which respectively have a pair of pivotal connections 72,73 carried on flanges secured to the locking bars 63,62 respectively. The rods 70,71 are interconnected with a turnbuckle 74 (FIG. 4). By the setting of the turnbuckle 74, the release time for the locking bars 62,63 is made the same. A spring means diagrammatically shown at 84 acts between the base 14 and an arm 75 which forms a part of the rigid system that interconnects the locking bars 62,63, which, by such spring means 84, are normally biased to the latch-dog locking position shown in FIG. 8. Thus pulling on the centrally located forwardly spaced manual actuator 68 effects simultaneous unlocking of the front pair and the rear pair of latch dogs 47. To support the actuator 68 and to enable it to be disposed in a position where the locking bars are held in the unlocked position, there is provided a bracket 76 fixably secured to the transverse beam 43 and which is of inverted U-shaped cross section as shown in FIG. 9. At its outermost end, the bracket 76 has an upwardly extending flange 77 with a key-hole shaped opening 78 therein. The rod 69 has a threaded portion on which a pair of jam nuts 79 are carried which can pass freely through the enlarged portion of the opening 78, but which cannot pass through the lower narrow portion. Depending upon the preference of the user, the nuts 79 can be set so that if they are drawn against the flange 77, release does not take place. Alternatively, they can be so set that release does take place. At any event, the purpose of the enlarged portion of the opening 78 is to enable the nuts 79 to pass therethrough and to be placed on the opposite side of the slot portion of the opening 78 as shown in FIG. 9 to positively hold the locking bars 62,63 in an open position.

With the rack assembly 10 in the position shown in solid lines in FIG. 2 and with the trip lock mechanism 18 disposed as shown in FIGS. 6–8, the bales 21 are loaded onto the rack assembly 10. If there is any danger that the load may fall off the front or the rear of the rack during subsequent movement, the load holders 19, 20 are placed in position as shown in FIG. 1 after which the vehicle is moved to the site where it is to be unloaded. The load-holders 19,20 need not be released or removed, and then the selectors are sequentially actuated to first unlock and then to unlatch the latch dogs 47. The off-center support of the racks 16,17 coupled with the off-center disposition of the bales 21 causes the racks 16,17 to tilt simultaneously in opposite directions to the position shown in chain lines in FIG. 2. This movement enables the bales to slide off the supporting rails 28–33, and in fact the bales land on the circular end and tip over onto what was the upper side of the bale initially. At this point return springs 38 bring the racks 16,17 back to the load-supporting position where they relatch. If the return springs are omitted, the operator of the tractor can advance the vehicle 11 to the point where the racks 16,17 clear the bales that are on the ground and can then manually restore them to the position shown. Assuming that return springs 38 are utilized, if the rack return was sluggish, for example if the rack were unloaded on a hillside so that full tilting did not take place as shown on FIG. 2, whereby less inertia of movement would be present for completing the movement, the springs 38 would still bring the rollers 46 against the cam surfaces 52. At this point, the actuator 56 could be briefly moved, and the rack 16 or 17 would move to the load-supporting position where the latch dogs could lock the same. With such springs 38, actuation of the actuator 56 under a no-load condition would not cause any rack tilting. With the actuators 56,68 so located and sized that they can be reached by the driver of the tractor pulling the land vehicle 11, the entire load can be unloaded without such operator's needing to get off the tractor for either operating the controls or for restoring the position of the racks 16,17.

Although various minor modifications might be suggested by those versed in the art, it should be understood that I wish to embody within the scope of the patent warranted hereon, all such embodiments as reasonably and properly come within the scope of my contribution to the art.

I claim as my invention:
1. A rack assembly for a land vehicle, comprising:
   (a) a base adapted to be fixedly secured to the vehicle;
   (b) two load carrying racks each having a pivotal connection with said base for respective movement between a load-supporting position and an unloading position, each said pivotal connection having a pivotal axis substantially parallel to the direction of the vehicle travel, a substantial portion of said racks respectively projecting beyond opposite sides of said base for projection beyond the side edges of the vehicle in both of said positions;

(c) a trip-lock mechanism acting between said base and said racks for releaseably holding said racks in said load-supporting position, upon the release of which said loaded racks can tilt in response to gravity, said trip lock mechanism including at least two latch dogs engaging each said rack; and (d) means on said base synchronizing the movement of said latch dogs to provide substantially simultaneous release thereof, said synchronizing means including (1) a pair of rods pivoted on said base between the pivotal axes of said racks and respectively supporting said latch dogs for said racks, and (2) means adjustably interconnecting said rods for simultaneous angular movement in opposite directions.

2. A rack assembly according to claim 1 including a pair of locking bars pivoted on said base and respectively extending between one of said latch dogs of one of said racks and another of said latch dogs of the other of said racks, and further means interconnecting said locking bars for the bars' being simultaneously selectably moved between a latch dog locking position and a latch dog unlocking position.

3. A rack assembly according to claim 2 including a manual actuator connected to said further interconnecting means and extending to a position spaced from an end of said base centrally thereof.

4. A rack assembly according to claim 2 including spring means acting to bias said locking bars in said latch dog locking position.

5. A rack assembly according to claim 4 including means acting between said further interconnecting means and said base for holding said locking bars in the latch dog unlocking position against the force of said spring means.

6. A rack assembly according to claim 1 including a manual actuator connected to said synchronizing means and extending to a position spaced from an end of said base centrally thereof.

7. A rack assembly for a land vehicle, comprising:

(a) a separate base adapted to be fixedly secured to the vehicle;

(b) two load carrying racks respectively having pivotal connections with said base along its opposite sides for respective movement between a load-supporting position and an unloading position, said pivotal connections having horizontally spaced pivotal axes substantially parallel to the direction of the vehicle travel, a substantial portion of said racks respectively projecting beyond opposite sides of said base for projection beyond the side edges of the vehicle in both of said positions; and (c) a trip-lock mechanism acting between said base and said racks for releaseably holding said racks in their load-supporting positions, upon the release of which mechanism, both of said loaded racks can tilt simultaneously in response to gravity.

8. A rack assembly according to claim 7 in which each of said racks has generally horizontal load-engaging and supporting rails each lying entirely at one side of the longitudinal center of said base and extending substantially at a right angle to said pivotal axis.

9. A rack assembly according to claim 8, each of said racks having three pair of support rails longitudinally spaced along the length of each of said racks and extending transversely to said length.

10. A rack assembly according to claim 7 in which said trip-lock mechanism includes at least two latch dogs engaging each said rack and means on said base synchronizing the movement of said latch dogs of both said racks to provide substantially simultaneous release thereof.

11. A rack assembly according to claim 10 in which said trip-dog mechanism further includes means on said base and operative on said latch dogs to selectably preclude rack-releasing movement thereof.

12. A rack assembly according to claim 10 in which each latch dog comprises a hook portion engaging a pivotable roller on said rack in the load-supporting position.

13. A rack assembly according to claim 7 including at least one socket secured to an end of said base and having a horizontal opening therein of non-circular cross-section, and a load holder comprising two arms joined together substantially at a right angle, one of said arms being of non-circular cross-section and being slidably non-rotatably received and held at a selected position along its length by said socket, and the other of said arms extending upwardly.

14. A rack assembly according to claim 13 in which said one arm is also receivable in said socket when said other arm is in a substantially horizontal storage position.

15. A rack assembly according to claim 7 in which the majority of the mass of each rack lies on that side of its pivotal axis which is the more remote from said trip-lock mechanism.

16. A rack assembly according to claim 7 including spring means acting between said base and said load-carrying racks, said spring means being loaded in response to tilting of the loaded rack, and operative to return the rack to said load-supporting position in response to the unloading of the tilted rack.

17. A rack assembly according to claim 7 in which said trip-lock mechanism includes a plurality of rack-holding latch dogs, means on said base for locking said latch dogs against unlatching, and means for selectably sequentially unlocking and unlatching said latch dogs.

* * * * *